Figure 1:
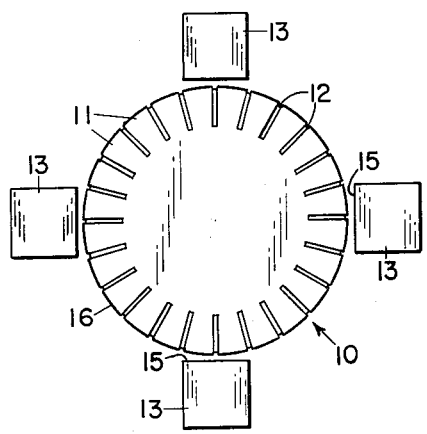

Dec. 6, 1955   W. D. CHRISTENSEN   2,725,697
PROCESS FOR SEATING THE BRUSHES ON AN ELECTRIC COMMUTATOR
Filed Nov. 2, 1953

INVENTOR
WALTER D. CHRISTENSEN

BY

ATTORNEYS

United States Patent Office 2,725,697
Patented Dec. 6, 1955

2,725,697

PROCESS FOR SEATING THE BRUSHES ON AN ELECTRIC COMMUTATOR

Walter D. Christensen, Coronado, Calif.

Application November 2, 1953, Serial No. 389,903

4 Claims. (Cl. 51—281)

(Granted under Title 35, U. S. Code (1952), sec. 266)

The invention described herein may be manufactured and used by or for the Government of the United States of America for governmental purposes without the payment of any royalties thereon or therefor.

This invention relates to a novel method for seating the brushes in contact with the commutator of a dynamo (electric generator or motor) so that the brushes fit the contour of the commutator.

In electrical machines having commutators, such as generators, motors and the like, the commutators become worn and uneven due to constant frictional contact with the brushes, and sparking and flashing. It is accordingly necessary to resurface these commutators and/or brushes at intervals to maintain the efficiency of the machine.

Various proposals have been made in the past to grind or resurface these members to enable the brushes to properly engage the commutator. Thus, for example, in U. S. Patent 1,660,316 a commutator resurfacing device is disclosed in the form of a block of abrasive material which is pressed upon the commutator while being rotated to resurface same. However, difficulty arises in connection with the patent procedure, since considerable care is required in the resurfacing operation in order to shape the commutator so as to achieve proper mating contact between the commutator and brush surfaces. Other procedures have also been employed for this purpose, none of which have been found completely satisfactory.

One object of this invention is to provide a novel and simple method for properly seating brushes to fit the contour of an electric motor or generator commutator with which the brushes are in contact.

Another object is the provision of a rapid inexpensive procedure for resurfacing the brushes in contact with an electric commutator to cause the surface of the brushes to make full mating contact with the rounded contour of the commutator surface.

Other objects and many of the attendant advantages of this invention will be readily appreciated as the same becomes better understood by reference to the following detailed description when considered in connection with the accompanying drawings wherein:

Figs. 1 to 4 illustrate various steps of one embodiment of the invention process.

Briefly, the foregoing objects and advantages are accomplished by applying an abrasive peelable coating to the commutator, rotating the commutator with the brushes in contact with said coating and removing the coating by peeling after the brushes have been shaped to fit the contour of the commutator. The coating is formed by applying to the surface of the commutator a liquid material having a substance therein such that the material on drying produces a thin tough film, abrasive particles being incorporated in such film.

Referring to the figures of the drawing, numeral 10 represents a commutator composed of an annular series of segments 11 of conducting material such as copper, separated from one another by strips or segments 12 of insulating material such as mica. In the embodiment shown, four carbon brushes 13 are equally spaced about the periphery of the commutator and arranged to make contact therewith.

Fig. 1 illustrates the shape or condition of the respective contacting surfaces 15 of either new brushes to be seated or worn brushes, and of surface 16 of the commutator, showing that brush surfaces 15 do not fit the rounded contour of commutator surface 16 and hence that the brushes are not properly seated with respect to the commutator.

Figure 2:
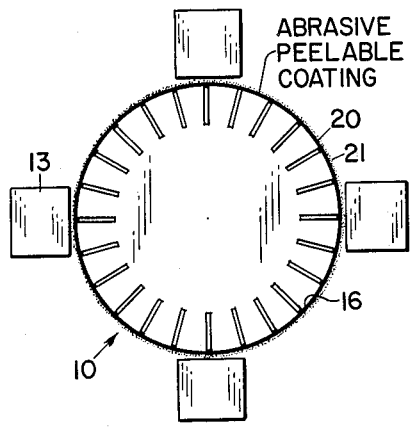

According to the invention a liquid suspension of particles of an abrasive material in a liquid vehicle having a resin or resin-forming substance therein is applied as by brushing, spraying or the like, to surface 16 of the commutator to form a peelable coating 20 as shown in Fig. 2. The resin produced from the resin-forming material in the suspension is generally of a thermoplastic nature. An illustrative liquid suspension according to the invention is in the form of a solution of vinyl resin, e. g. polyvinyl acetate, polyvinyl chloride, or mixtures or co-polymers of these materials, in an organic solvent such as methylethyl ketone, with particles of an abrasive material distributed therein.

Liquid vehicles or solvents other than that mentioned specifically above may be employed, and also various resins or resin-forming substances in addition to those noted above may be utilized to produce a tough peelable plastic coating or film on drying of the suspension. The amount of resinous material utilized is variable, but should be sufficient to provide a tough unbreakable abrasive coating which will withstand the grinding thereon of the commutator brushes, and at the same time be readily peelable when it is desired to remove the coating from the commutator surface. These ingredients, particularly the liquid vehicle which essentially evaporates, and the amounts of the ingredients employed are also chosen to confer quick-drying properties on the suspension. A specific suitable combination of liquid vehicle and resin material is a commercial product known as "Liquid Envelope," manufactured by the Better Finishes and Coatings Company of Newark, New Jersey. This product is believed to contain polyvinyl acetate resin in solution or in fluid state in methyl-ethyl ketone.

The abrasive material suspended in the vehicle is in the form of particles of a substance which is substantially non-conductive, e. g. sand, to avoid short circuiting of the device during grinding or resurfacing of the brushes in accordance with the invention. The particles employed are relatively fine, for example of a 220 mesh size.

Other ingredients may be incorporated into the above liquid suspension, if desired, to provide it with optimum properties for the purposes of the invention. For example, plasticizers and stabilizers may be incorporated into the coating mixture.

After the liquid suspension has been applied to the surface of the commutator to form coating 20 and while the coating is still tacky, substantially non-conductive grit or abrasive particles 21 which are coarser or of larger particle size than the abrasive particles originally present in the liquid coating suspension, are distributed as by sifting over the tacky coating. Thus, the grit may be of a 180 mesh particle size as compared to a 220 mesh size for the abrasive particles in the coating suspension. The grit particles lodge in the coating essentially in the surface thereof to form on drying thereof an efficient abrading or grinding surface for the brushes, while the finer particles of abrasive distributed throughout the body of the coating serve chiefly to finish and polish off the surface of the brushes after they have been essentially ground to fit the contour of the commutator.

Following distribution of the relatively coarse grit over the coating, the latter is permitted to dry. The drying period according to the invention is of relatively short duration. Where the above noted "Liquid Envelope" is employed as the liquid medium containing the film-forming substance, the drying period of the resulting coating can be less than an hour, for example ten to thirty minutes or even less. The thickness of the coating so formed can be varied depending upon conditions such as the size of the commutator and brushes to be surfaced, but is ordinarily relatively small, and may for example be on the order of only .01 to .02 inch thick.

Figure 3:
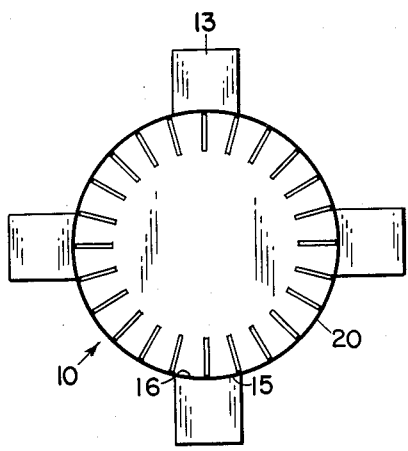
Figure 4:
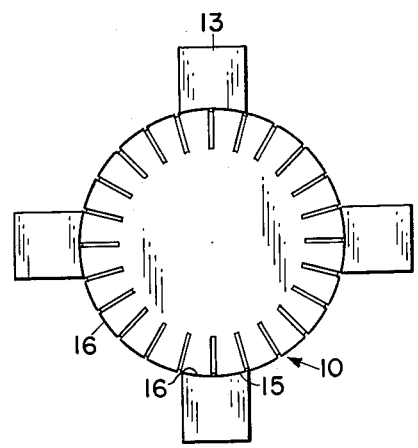

After the abrasive coating has dried and hardened, the commutator is rotated with the brushes in contact with the abrasive coating. In this manner the brushes are ground or resurfaced so that surfaces 15 thereof have the same curvature or contour as commutator surface 16 and are adapted to mate therewith, as illustrated in Fig. 3, after removal of the coating. When the brushes have been ground to fit the circular contour of the commutator, the thin plastic coating or film 20 is peeled from the surface of the commutator, bringing the bare surface thereof into contact with the brushes, which are now properly seated in relation to the commutator so as to provide maximum contact between brush surfaces 15 and commutator surface 16 as shown in Fig. 4.

The two different sizes of abrasive particles employed in the coating according to the invention may be of the same material, e. g. sand, or of two different materials. Further, if desired, abrasive or grit particles of more than two sizes can be utilized. Also, it may be adequate in certain cases to incorporate abrasive particles of substantially a single size in the coating, and these particles may be introduced therein before or after the coating has been applied to the commutator surface, or partly before and partly after such application of the plastic coating.

From the foregoing, it is seen that the invention affords a simple, rapid, efficient and inexpensive procedure for resurfacing the brushes in contact with an electrical commutator to properly seat the brushes so that the surfaces thereof fit the rounded contour of the commutator surface. The invention process may be readily practiced in connection with commutators and brushes of various sizes, and the abrasive-containing coating or film of the invention readily adheres to the surface of the commutator regardless of size, and is quickly and easily removed therefrom simply by peeling after the brushes have been seated. The coating may be even thinner than paper, yet the instant process enables the grinding of the brushes sufficiently to seat them with maximum surface-to-surface contact with respect to the commutator.

Obviously many modifications and variations of the present invention are possible in the light of the above teachings. It is therefore to be understood that within the scope of the appended claims the invention may be practiced otherwise than as specifically described.

I claim:

1. The process of seating brushes to fit the contour of an electric commutator which comprises applying in liquid form an abrasive peelable coating to the commutator, rotating said commutator with the brushes in contact with said coating, and removing said coating by peeling after the brushes have been shaped to fit the contour of said commutator.

2. The process of seating brushes to fit the contour of an electric commutator which comprises spraying in liquid form an abrasive peelable coating on the commutator, rotating said commutator with the brushes in contact with said coating, and removing said coating by peeling after the brushes have been shaped to fit the contour of said commutator.

3. The process of seating brushes to fit the contour of an electric commutator which comprises brushing in liquid form an abrasive peelable coating on the commutator, rotating said commutator with the brushes in contact with said coating, and removing said coating by peeling after the brushes have been shaped to fit the contour of said commutator.

4. The process of seating brushes to fit the contour of an electric commutator which comprises applying to the surface of said commutator a liquid suspension of particles of an abrasive material in a liquid vehicle having quick drying properties, said vehicle containing in solution therein a resin-forming material, said material forming on drying a thin, tough peelable plastic coating, rotating said commutator in contact with said brushes until the latter are shaped to fit the contour of the commutator, and peeling said plastic coating from the commutator.

References Cited in the file of this patent

UNITED STATES PATENTS

| Number | Name | Date |
|---|---|---|
| Re. 21,552 | Benner et al. | Sept. 10, 1940 |
| 875,936 | Landis | Jan. 7, 1908 |
| 1,138,479 | Hough | May 4, 1915 |
| 1,208,688 | Stemple | Dec. 12, 1916 |
| 1,217,593 | Graft | Feb. 27, 1917 |
| 1,241,738 | Klatte et al. | Oct. 2, 1917 |
| 1,395,880 | Ward | Nov. 1, 1921 |
| 1,570,166 | Morris | Jan. 19, 1926 |
| 1,775,631 | Carlton | Sept. 16, 1930 |
| 1,903,101 | Faley | Mar. 28, 1933 |
| 1,998,303 | Barringer | Apr. 16, 1935 |
| 2,226,553 | Cross | Dec. 31, 1940 |